(12) United States Patent  
Sirohey et al.

(10) Patent No.: US 7,983,463 B2
(45) Date of Patent: Jul. 19, 2011

(54) METHODS AND APPARATUS FOR SUPPRESSING TAGGING MATERIAL IN PREPLESS CT COLONOGRAPHY

(75) Inventors: Saad Ahmed Sirohey, Pewaukee, WI (US); Renaud Capolunghi, Vanves (FR); Huy-Nam Doan, Savigny sur Orge (FR)

(73) Assignee: General Electric Company, Schenectady, NY (US)

( * ) Notice: Subject to any disclaimer, the term of this patent is extended or adjusted under 35 U.S.C. 154(b) by 939 days.

(21) Appl. No.: 11/603,854

(22) Filed: Nov. 22, 2006

(65) Prior Publication Data

US 2008/0118133 A1 May 22, 2008

(51) Int. Cl.
*G06K 9/00* (2006.01)
(52) U.S. Cl. ....................................................... 382/131
(58) Field of Classification Search .................... 382/131
See application file for complete search history.

(56) References Cited

U.S. PATENT DOCUMENTS

| | | | |
|---|---|---|---|
| 6,331,116 B1 | 12/2001 | Kaufman et al. | |
| 6,477,401 B1 | 11/2002 | Johnson et al. | |
| 6,603,494 B1 | 8/2003 | Banks et al. | |
| 6,925,200 B2 | 8/2005 | Wood et al. | |
| 6,947,784 B2 | 9/2005 | Zalis | |
| 7,027,630 B2 | 4/2006 | Bruijns | |
| 7,072,501 B2 | 7/2006 | Wood et al. | |
| 7,123,760 B2 | 10/2006 | Mullick et al. | |
| 2005/0094858 A1 | 5/2005 | Sirohey et al. | |
| 2005/0147297 A1 | 7/2005 | McLaughlin et al. | |
| 2005/0259854 A1 | 11/2005 | Arimura et al. | |
| 2006/0074285 A1 | 4/2006 | Zarkh et al. | |
| 2006/0079743 A1 | 4/2006 | Ferrant et al. | |
| 2006/0079761 A1* | 4/2006 | Tu et al. | 600/425 |
| 2006/0094961 A1* | 5/2006 | Mikheev et al. | 600/437 |
| 2006/0215896 A1 | 9/2006 | Sirohey et al. | |
| 2007/0127803 A1* | 6/2007 | Yoshida et al. | 382/131 |
| 2007/0127804 A1* | 6/2007 | Yoshida et al. | 382/131 |
| 2007/0165928 A1* | 7/2007 | Yoshida et al. | 382/128 |

FOREIGN PATENT DOCUMENTS

WO WO-03/0452222 A2 6/2003

OTHER PUBLICATIONS

"An Improved Electronic Colon Cleansing Method for Detection of Polyps by Virtual Colonoscopy", Wang, Zigang et al., Proceedings of the 2005 IEEE Engineering in Medicine and Biology 27th Annual Conference Shanghai, China, Sep. 1-4, 2005, pp. 6512-6515.*

(Continued)

*Primary Examiner* — Wenpeng Chen
(74) *Attorney, Agent, or Firm* — Dean Small; The Small Patent Law Group

(57) ABSTRACT

A method for suppressing tagged material in prepless colonoscopy includes identifying and segmenting multiple density classes, intensity classes, or both in a volumetric medical image of a patient including a volume of the patient's colon and classifying the volume of the patient's colon into a plurality of types based upon the identified and segmented density classes, intensity classes, or both. The method further includes subtracting, suppressing, or leaving the tagged material in the image in accordance with the type classifications to produce a resulting image and visualizing the resulting image.

22 Claims, 8 Drawing Sheets

OTHER PUBLICATIONS

"Hybrid Segmentation of Colon Filled With Air and Opacified Fluid for CT Colonography", Marek Franaszek et al. ,IEEE Transactions on Medical Imaging, vol. 25, No. 3, Mar. 2006, pp. 358-368.*

"An Improved Electronic Colon Cleansing Method for Detection of Polyps by Virtual Colonoscopy", Wang, Zigang et al., IEEE Transactions on Biomedical Engineering, vol. 53, No. 8, Aug. 2006, pp. 1635-1646.*

U.S. Appl. No. 60/741,103, filed Nov. 30, 2005.*

Hirai et al., Intracranial Aneurysms at MR Angiography: Effect of Computer-aided diag on Radiologists Det. Perf., Radiology 2005; 237:605-610, RSNA 2005.

Doi, Current status and future potential of computer-aided diagnosis in medical imaging, British Journal of Radiology (2005) 78, S3-s19.

Hisanori et al., Development of cerebral aneurysm computer-aided detection systems with 3D mra data, Yokogawa Technical Report English Edition, No. 39 (2005).

Kobashi et al., Computer-aided diagnosis of intracranial aneurysms in MRA images with case-based reasoning, IEICE Transactions on Information and Systems 2006 E89-D(1):340-350.

Uchiyama et al., Computer-aided diagnosis scheme for detection of unruptured intracranial aneurysms in MR angiography, Eng in Med and Bio Society, 2005; IEEE-EMBS 20.

Laurent Saroul, et al.; "Distance Preserving Flattening of Surface Sections", IEEE Transactions on visulaization and computer Graphics, vol. 12, No. 1, Jan.-Feb. 2006, 10 pgs.

Sonka and J Michael Fitzpatrick et al., Handbook of Medical Imaging, vol. 2, Medical Image Processing and Analysis, Jan. 1, 2000, pp. 711-810, 898-914.

Foreign Search Report, Netherlands Application No. 1034671, Dated Oct. 20, 2008 (15 pages).

Cai, et al., Structure-based digital bowel cleansing for computer-aided detection of polyps in CT colonography, Special Session on Colon Liver and Brain CAD, Int J CARS (2006), pp. 369-371.

J. Nappi, et al., Adaptive normalization of fecal-tagging CT colonography images for computer-aided detection of polyps, Special Session on Colon Liver and Brain CAD, Int J CARS (2006), pp. 371-372.

Masahiro Oda, et al., An improved method for generating less-distorted virtual unfolded views of the colon for CT colonography, Special Session on Colon Liver and Brain CAD, Int J CARS (2006), pp. 373-375.

Cai, et al., Computer-aided volumetrics of liver tumors in hepatic CT images, Special Session on Colon Liver and Brain CAD, Int J CARS (2006), pp. 375-377.

Wei, et al., Computer assistance in the 4D application of identifying and evaluating small hepatocellular carcinomas by multiphase MDCT, Special Session on Colon Liver and Brain CAD, Int J CARS (2006), pp. 377-379.

Lee, et al., Classification of cirrhotic liver on MR images using texture analysis, Special Session on Colon Liver and Brain CAD, Int J CARS (2006), pp. 379-381.

Nakamura, et al., A study on blood vessel segmentation and lymph node detection from 3D abdominal X-ray CT images, Special Session on Colon Liver and Brain CAD, Int J CARS (2006), pp. 381-382.

Uchiyama, et al., CAD scheme for detection of lacunar infarcts in brain MR image, Special Session on Colon Liver and Brain CAD, Int J CARS (2006), pp. 382-385.

Arimura, et al., Improvement and evaluation of computerized method for detection of intracranial aneurysms for 3-D MR angiography, Special Session on Colon Liver and Brain CAD, Int J CARS (2006), pp. 385-386.

de Oliveira, et al., Support software for clinical diagnosis in epilepsy; B.R.A.S.L.L. brain registration and substraction: improved localization for SPECT analysis, Special Session on Colon Liver and Brain CAD, Int J CARS (2006), pp. 386-388.

Saad Sirohey, PhD, Lead System Designer, Computer Aided Diagnosis, Lung VCAR, a technical description, GE Healthcare, 2005, 6 pgs.

Lichan Hong, et a., Virtual Voyage: Interactive Navigation in the Human Colon, Center for Visual Computing State University of New York at Stony Brook, 1997, 8 pgs.

* cited by examiner

53

54
Acquire Volumetric Medical Image of a Patient, Including a Volume of the Colon 55
Identify and Segment Multiple Density/Intensity Classes in the Colon 56
Classify the Colon Volume into a Plurality of Types Based upon Density/Intensity 57
Subtract, Suppress, or Leave the Tagged Material in the Tagged Image in Accordance with the Type Classifications 58
Visualize the Resulting Image

FIG. 3

METHODS AND APPARATUS FOR SUPPRESSING TAGGING MATERIAL IN PREPLESS CT COLONOGRAPHY

BACKGROUND OF THE INVENTION

This invention relates generally to imaging, and more particularly to determining the mass and the volume of soft matter in reconstructed images and, for medical images, suppressing and/or removing tagged material in images. Configurations of the present invention are particularly useful in medical and diagnostic colonography examinations.

In some known CT imaging system configurations, an x-ray source projects a fan-shaped beam which is collimated to lie within an X-Y plane of a Cartesian coordinate system and generally referred to as an "imaging plane". The x-ray beam passes through an object being imaged, such as a patient. The beam, after being attenuated by the object, impinges upon an array of radiation detectors. The intensity of the attenuated radiation beam received at the detector array is dependent upon the attenuation of an x-ray beam by the object. Each detector element of the array produces a separate electrical signal that is a measurement of the beam intensity at the detector location. The intensity measurements from all the detectors are acquired separately to produce a transmission profile.

In third generation CT systems, the x-ray source and the detector array are rotated with a gantry within the imaging plane and around the object to be imaged such that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector.

In an axial scan, the projection data is processed to construct an image that corresponds to a two-dimensional slice taken through the object. One method for reconstructing an image from a set of projection data is referred to in the art as the filtered backprojection technique. This process converts the attenuation measurements from a scan into integers called "CT numbers" or "Hounsfield units" (HU), which are used to control the brightness of a corresponding pixel on a cathode ray tube display.

To reduce the total scan time, a "helical" scan may be performed. To perform a "helical" scan, the patient is moved while the data for the prescribed number of slices is acquired. Such a system generates a single helix from a fan beam helical scan. The helix mapped out by the fan beam yields projection data from which images in each prescribed slice may be reconstructed.

Reconstruction algorithms for helical scanning typically use helical weighing algorithms that weight the collected data as a function of view angle and detector channel index. Specifically, prior to a filtered backprojection process, the data is weighted according to a helical weighing factor, which is a function of both the gantry angle and detector angle. The weighted data is then processed to generate CT numbers and to construct an image that corresponds to a two-dimensional slice taken through the object.

To further reduce the total acquisition time, multi-slice CT has been introduced. In multi-slice CT, multiple rows of projection data are acquired simultaneously at any time instant. When combined with helical scan mode, the system generates a single helix of cone beam projection data. Similar to the single slice helical, weighting scheme, a method can be derived to multiply the weight with the projection data prior to the filtered backprojection algorithm.

Colon cancer is the third largest cause of cancer-related mortality in the United States, with an estimated 57,000 deaths in 2003. U.S. cancer statistics show that a person has an approximately 5% chance of getting colon cancer in his or her lifetime. Colonic polyps form a pre-cancerous stage of the disease, and if these are removed in time in a person, that person has about a 90% chance of surviving five years or more.

Colonoscopy has been a preferred prior art method for screening for colon cancer. Colonoscopy has an acceptance of 37% as a result of its invasive nature. It has been hoped that CT colonography will increase the acceptance of colon cancer screening by restricting the use of invasive colonoscopy screening procedures only to those that are necessary. However, the reported sensitivity of known CT colonography methods (currently 60-70%) has not yet reached a level comparable to colonoscopy methods.

A common complaint of patients undergoing colonoscopy procedures is the cathartic nature of the colon cleansing prior to the exam. To most patients, this cathartic colon cleansing equates non-invasive CT colonography to the invasive colonoscopy procedure. In response to the discomfort felt by most patients, a non-cathartic or minimum cathartic preparation has been developed that tags liquid and solid fecal mater for subsequent removal using digital subtraction algorithms. These subtraction techniques, however, blindly remove the tagging material or artificially smooth the surface between the removed material and colon lumen. In addition, there is no teaching or suggestion in either of these techniques incorporating the inherent system deformations that happen due to the imaging process.

BRIEF DESCRIPTION OF THE INVENTION

In one aspect, some configurations of the present invention provide a method for suppressing tagged material in prepless colonoscopy includes identifying and segmenting multiple density classes, intensity classes, or both in a volumetric medical image of a patient including a volume of the patient's colon and classifying the volume of the patient's colon into a plurality of types based upon the identified and segmented density classes, intensity classes, or both. The method further includes subtracting, suppressing, or leaving the tagged material in the image in accordance with the type classifications to produce a resulting image and visualizing the resulting image.

In another aspect, some configurations of the present invention provide a machine-readable medium or media having instructions recorded thereon configured to instruct a computer to visualize an image with suppression of tagging material for prepless colonography. The instructions include instructions configured to instruct the computer to identify and segment multiple density classes, intensity classes, or both in a volumetric medical image of a patient including a volume of the patient's colon and classify the volume of the patient's colon into a plurality of types based upon the identified and segmented density classes, intensity classes, or both. The instructions further include instructions to subtract, suppress, or leave tagged material in the image in accordance with the type classifications to produce a resulting image and to visualize the resulting image.

In yet another aspect, some configurations of the present invention provide a medical imaging apparatus having a radiation source, a detector array, an image processor, a display, and a memory. The medical imaging apparatus is controlled by a computer. The computer is configured to instruct the computer to identify and segment multiple density classes, intensity classes, or both in a volumetric medical image of a patient including a volume of the patient's colon and to classify the volume of the patient's colon into a plurality of types based upon the identified and segmented density classes, intensity classes, or both. The computer is further configured to subtract, suppress, or leave tagged material in the image in accordance with the type classifications to produce a resulting image and to visualize the resulting image.

It will be appreciated that some configurations of the present invention provide intelligent classification of tagging materials for removal, visual suppression, or no action, and can provide a higher acceptance of colonography procedures. Moreover, some configurations of the present invention provide digital subtraction of liquid and solid fecal matter without blindly removing the tagging material or artificially smoothing the interface between the removed material and the colon lumen, and some configurations can incorporate and correct for inherent system deformations that happen as a result of the imaging process.

BRIEF DESCRIPTION OF THE DRAWINGS

FIG. 3 is a flow chart representative of some configurations of the present invention, showing the determination of a plaque score (and other metrics) from an acquired volumetric image of a patient that includes a volume of interest.

DETAILED DESCRIPTION OF THE INVENTION

Figure 1:
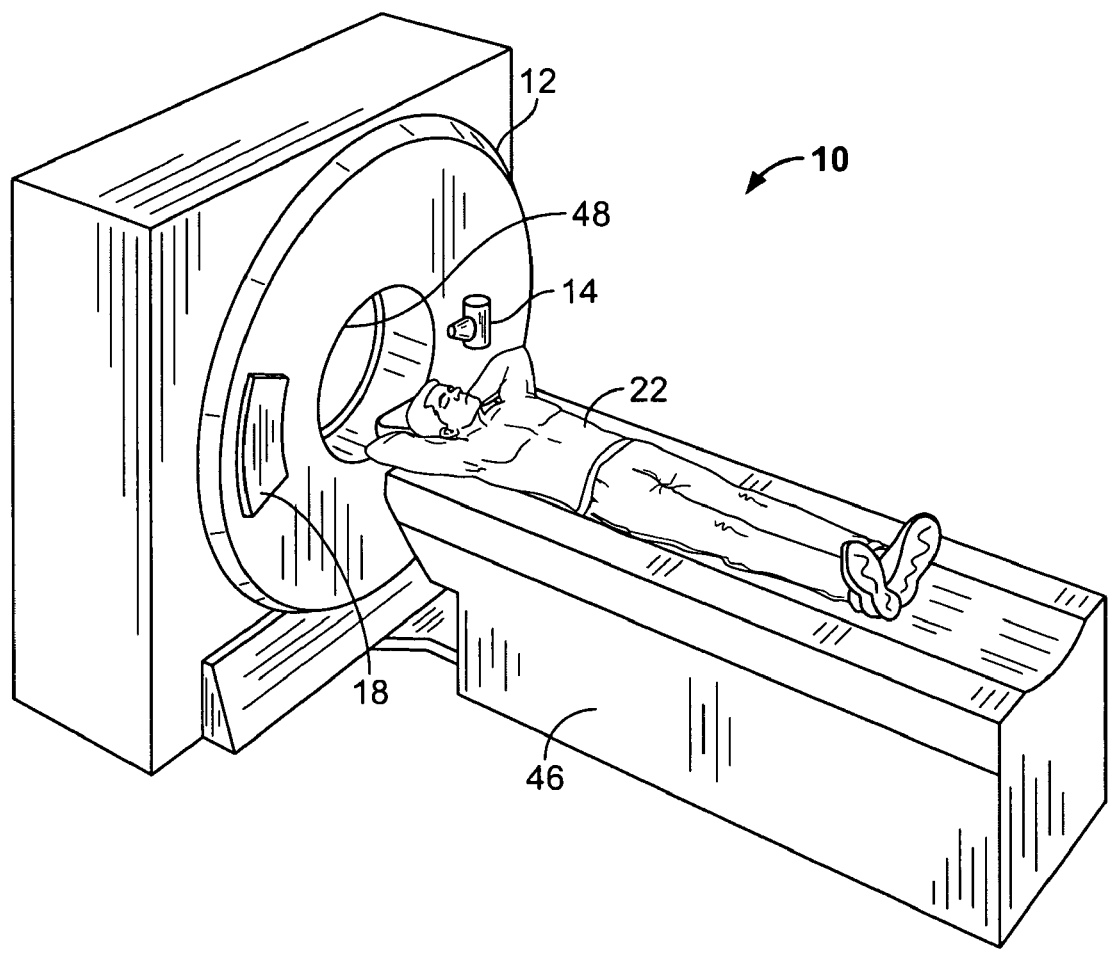
FIG. 1 is a pictorial drawing of a configuration of a computed tomographic (CT) imaging system of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "reconstructing an image" is not intended to exclude embodiments of the present invention in which data representing an image is generated but a viewable image is not. However, many embodiments generate (or are configured to generate) at least one viewable image.

The recitation of a single object or action is not intended to exclude configurations involving plural said objects or said actions from the scope of a claim, unless it is explicitly recited otherwise. For example, a claim reciting the action "identifying a region of exclusion" without further qualification as to number is intended to include within its scope configurations in which a plurality of regions of exclusion are identified.

Technical effects of the present invention include, but are not limited to, the modification of a medical image to remove or suppress tagging materials, thereby making underlying structures in the colon visible and thus enhancing the effectiveness of non-invasive conolography in screening for colon cancer. As used herein, unless referring to an image actually being displayed, the scope of the subject matter referred to by the term "image" is also intended to include data representing an image, i.e., an image in a form useful for processing by a computer.

Figure 2:
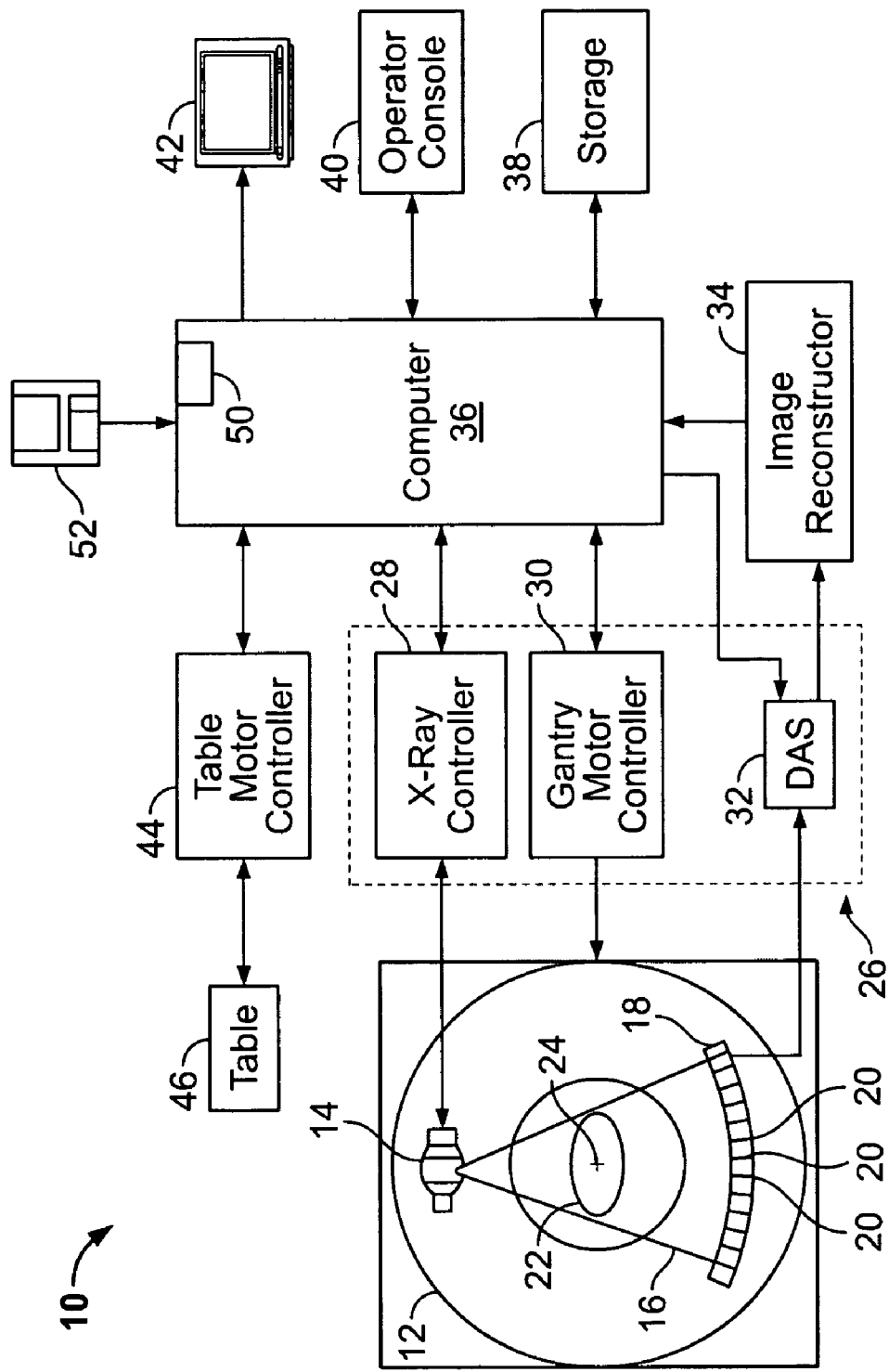
FIG. 2 is a schematic block diagram of the CT imaging system of FIG. 1.

Referring to FIGS. 1 and 2, a multi-slice scanning imaging system, for example, a Computed Tomography (CT) imaging system 10, is shown as including a gantry 12 representative of a "third generation" CT imaging system. Gantry 12 has an x-ray tube 14 (also called x-ray source 14 herein) that projects a beam of x-rays 16 toward a detector array 18 on the opposite side of gantry 12. Detector array 18 is formed by a plurality of detector rows (not shown) including a plurality of detector elements 20 which together sense the projected x-rays that pass through an object, such as a medical patient 22 between array 18 and source 14. Each detector element 20 produces an electrical signal that represents the intensity of an impinging x-ray beam and hence can be used to estimate the attenuation of the beam as it passes through object or patient 22. During a scan to acquire x-ray projection data, gantry 12 and the components mounted therein rotate about a center of rotation 24. FIG. 2 shows only a single row of detector elements 20 (i.e., a detector row). However, multi-slice detector array 18 includes a plurality of parallel detector rows of detector elements 20 such that projection data corresponding to a plurality of quasi-parallel or parallel slices can be acquired simultaneously during a scan.

Rotation of components on gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of components on gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high-speed image reconstruction. The reconstructed image is applied as an input to a computer 36, which stores the image in a storage device 38. Image reconstructor 34 can be specialized hardware or computer programs executing on computer 36.

Computer 36 also receives commands and scanning parameters from an operator via console 40 that has a keyboard and/or other user input and/or marking devices, such as a mouse, trackball, or light pen. An associated display 42, examples of which include a cathode ray tube (CRT) display, liquid crystal display (LCD), or plasma display, allows the operator to observe the reconstructed image and other data from computer 36. Display 42 may include a user pointing device, such as a pressure-sensitive input screen. The operator supplied commands and parameters are used by computer 36 to provide control signals and information to DAS 32, x-ray controller 28, and gantry motor controller 30. In addition, computer 36 operates a table motor controller 44, which controls a motorized table 46 to position patient 22 in gantry 12. Particularly, table 46 moves portions of patient 22 through gantry opening 48.

In one embodiment, computer 36 includes a device 50, for example, a floppy disk drive, CD-ROM drive, DVD drive, magnetic optical disk (MOD) device, or any other digital device including a network connecting device such as an Ethernet device for reading instructions and/or data from a computer-readable medium 52, such as a floppy disk, a CD-ROM, a DVD or another digital source such as a network or the Internet, as well as yet to be developed digital means. In another embodiment, computer 36 executes instructions stored in firmware (not shown). Computer 36 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein. Although the specific embodiment mentioned above refers to a third generation CT system, the methods described herein equally apply to fourth generation CT systems (stationary detector-rotating x-ray source) and fifth generation CT systems (stationary detector and x-ray source). Additionally, it is contemplated that the benefits of the invention accrue to imaging modalities other than CT. Additionally, although the herein described methods and apparatus are described in a medical setting, it is contemplated that the benefits of the invention accrue to non-medical imaging systems such as those systems typically employed in an industrial setting or a transportation setting, such as, for example, but not limited to, a baggage scanning system for an airport or other transportation center.

In prior art configurations, an algorithm to determine mass and volume of calcification relies upon the relationship $$m=CV_\tau(\mu_c-\mu_w),$$

where m is the mass, C is the calcium calibration correction, $\mu_c$ is the mean density of the thresholded volume $V_\tau$, where τ is a calibrated, user-defined threshold (for example, if a user selects 130 as the threshold, then τ=C×130), $\mu_w$ is a mean density value for water, and volume $V_\tau$ is determined by multiplying the number of voxels greater than τ by the dimension of the voxel, ∂x∂y∂z.

Using methods described by flowchart 53 in FIG. 3 and variations described herein, a CT image of a colon of a patient is analyzed using a computer, which classifies tagging materials for removal, visual suppression, or no action.

Specifically, at 54, an imaging apparatus is used to acquire a volumetric medical image of a patient 22, the image including a volume of the colon of the patient. The imaging apparatus may be a computed tomography (CT) imaging system, such as imaging system 10 above, or it can be any other type of imaging system (e.g., ultrasonic or NMR) that can acquire a volumetric image that includes a volume of a colon.

Next, at 55, multiple density classes, intensity classes, or both are identified and segmented in the volumetric medical image. Next, at 56, the colon volume is classified into a plurality of types based upon density, intensity, or both. Implementations for functions provided at 55 and 56 used in some configurations of the present invention are provided in FIG. 4 and FIG. 5, discussed in detail below following the description of FIG. 3.

Next, at 57, the tagged material in the tagged image is subtracted, suppressed, or left in the image, depending upon the type classifications of the colon volume determined at 56. The procedures at 55, 56, and 57 are repeated one or more times as needed to produce a resulting image. Finally, at 58, the resulting image is visualized, i.e., displayed on a display, such as display 42, shown in FIG. 2.

The adaptive algorithm of FIG. 3 uses a density/intensity based hierarchical method to identify the different classes of the colon volume. Initial threshold values are set in flow chart 62 of FIG. 4 as a starting point then adaptively localize spatial regions of the highest density/intensity object or objects using a system resolution dependent expectation maximization (EM) algorithm of FIG. 5. The regions thus identified are removed from the colon volume and the initial threshold of the next highest density object is used to repeat the process. The process repeats until all classes are identified. The output of the algorithm includes a new threshold value for each object class for visual display and a set of objects themselves within the class for VR suppression, quantification, etc.

Figure 4:
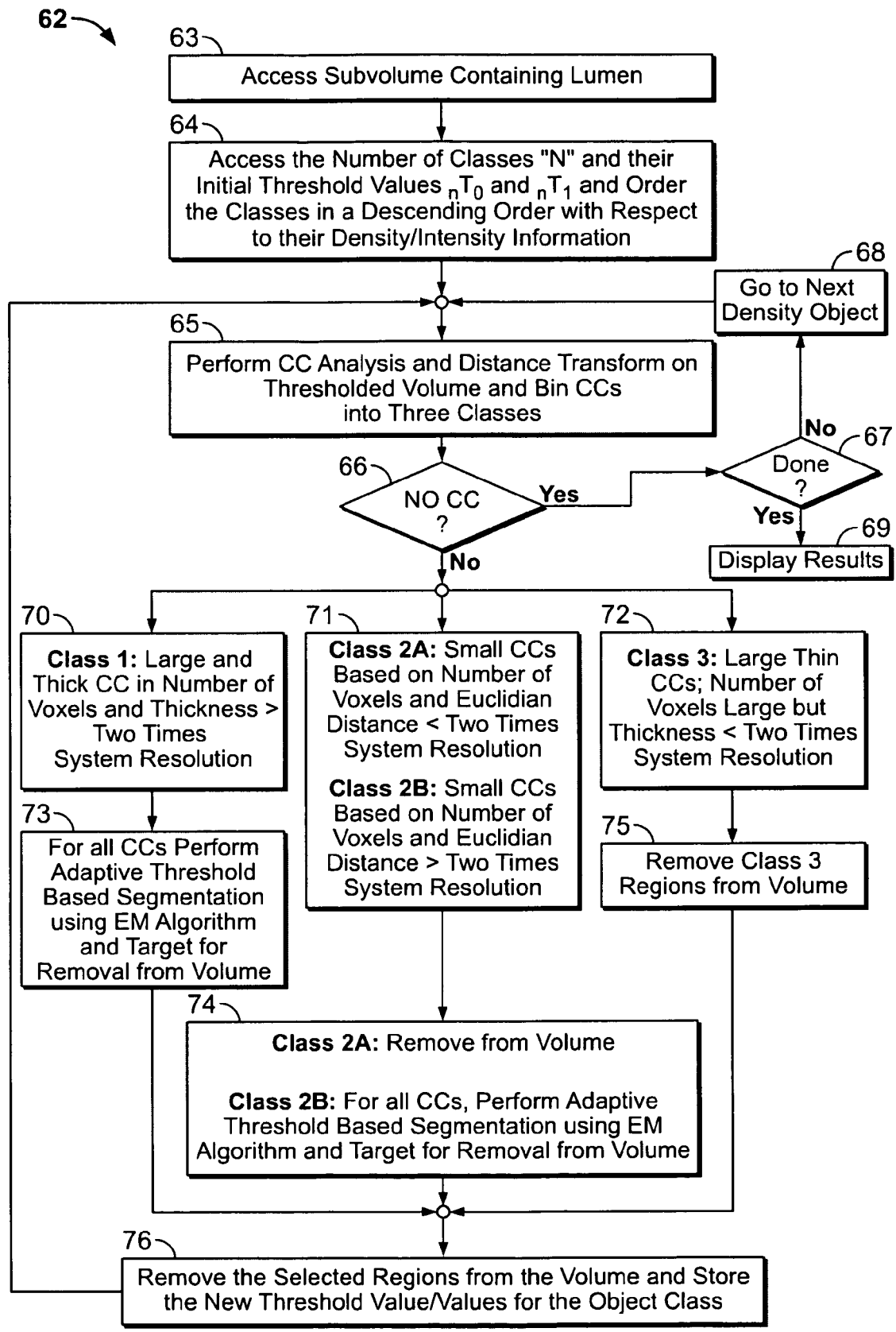
FIG. 4 is a flow chart showing one configuration of a method of the present invention by which plaque regions are located and a subvolume of the volumetric image is segmented.

The identification and segmentation performed at 55 and 56 is a special 3 class problem that can be solved by a computer algorithm illustrated in flow chart 62 of FIG. 4. The algorithm, once sufficiently understood by one of ordinary skill in the art, is readily adaptable to any number of classes separable in intensity. Flow chart 63 thus represents one configuration of the computer procedures and functions performed at both 55 and 56 of FIG. 3.

Referring to FIG. 4, at 63, a subvolume (not necessarily a proper subvolume) of a medical image is accessed containing a volume of the colon. This access can be performed by retrieving the contents of a memory or storage device representing the subvolume of the image. (For purposes of this description and the appended claims, accessing or using memory representing an image is considered the same as accessing or using an image.) Next, at 64, the number of classes "n" and their initial threshold values are accessed and ordered in a descending manner with respect to the density/intensity information of the classes. (Flowchart 62 represents only one embodiment of the functions and procedures performed at 55 and 56 of FIG. 3. Design choice alternatives such as ordering threshold values in an ascending manner are not described herein.)

Next, at 65, a connected component (CC) analysis is performed on voxels in the subvolume followed by a distance transform on the threshold volume and the CCs are then binned them into three classes. The distance transform used in some configurations of the present invention is Euclidean, but other distance metrics, such as a chessboard metric or a city block metric can be used in other configurations of the present invention. If there are no connected components at 66, a check is performed to determine whether the procedure has been performed on all objects of interest in the subvolume at 67. If not, the next density object is readied at 68, and the analysis at 65 is repeated. If all objects of interest have been handled at 67, results may be displayed at 69, or, more importantly for the present description, fed into the procedure represented by flowchart 101, shown in FIG. 5.

Returning to FIG. 4, if there are CCs at 66, they are divided into classes as shown at 70, 71, and 72. Large and thick CCs in number of voxels and having a thickness (from Euclidean distance) greater then 2 times the system resolution in voxels are placed in Class 1 at 70. At 70, pruning may be performed if thin structures are connected to a CC. The pruning may be performed using opening operations. Small CC's based on the number of voxels are placed in Class 2. If the Euclidean distance is less than twice the system resolution in voxels, the CC is placed in Class 2A at 71. Otherwise, the Euclidean distance is greater than twice the system resolution in voxels, and the CC is placed in Class 2B at 71. Large thin CCs for which the number of voxels is large but the maximum Euclidean distance is less than twice system resolution are placed in Class 3 at 72. In the event the Euclidean distance is exactly twice the system resolution, a large CC may be placed arbitrarily in either Class 1 or Class 3. If a Class 2 CC has a Euclidean distance exactly equal to twice the system resolution, the Class 2 CC may be arbitrarily assigned to either Class 2A or Class 2B.

Next, at 73 (for Class 1), 74 (for Class 2A and 2B), and 75 (for Class 3), system resolution specific expectation maximization (EM) adaptive threshold based segmentation is performed for all CCs identified for Class 1 (if any), and the location of class 2 and class 3 objects are identified. Next, at 76, the objects in the current threshold volume are removed from the subvolume and one or more new threshold values are stored for the object class. From 73, the procedure continues at 65.

Figure 5A:
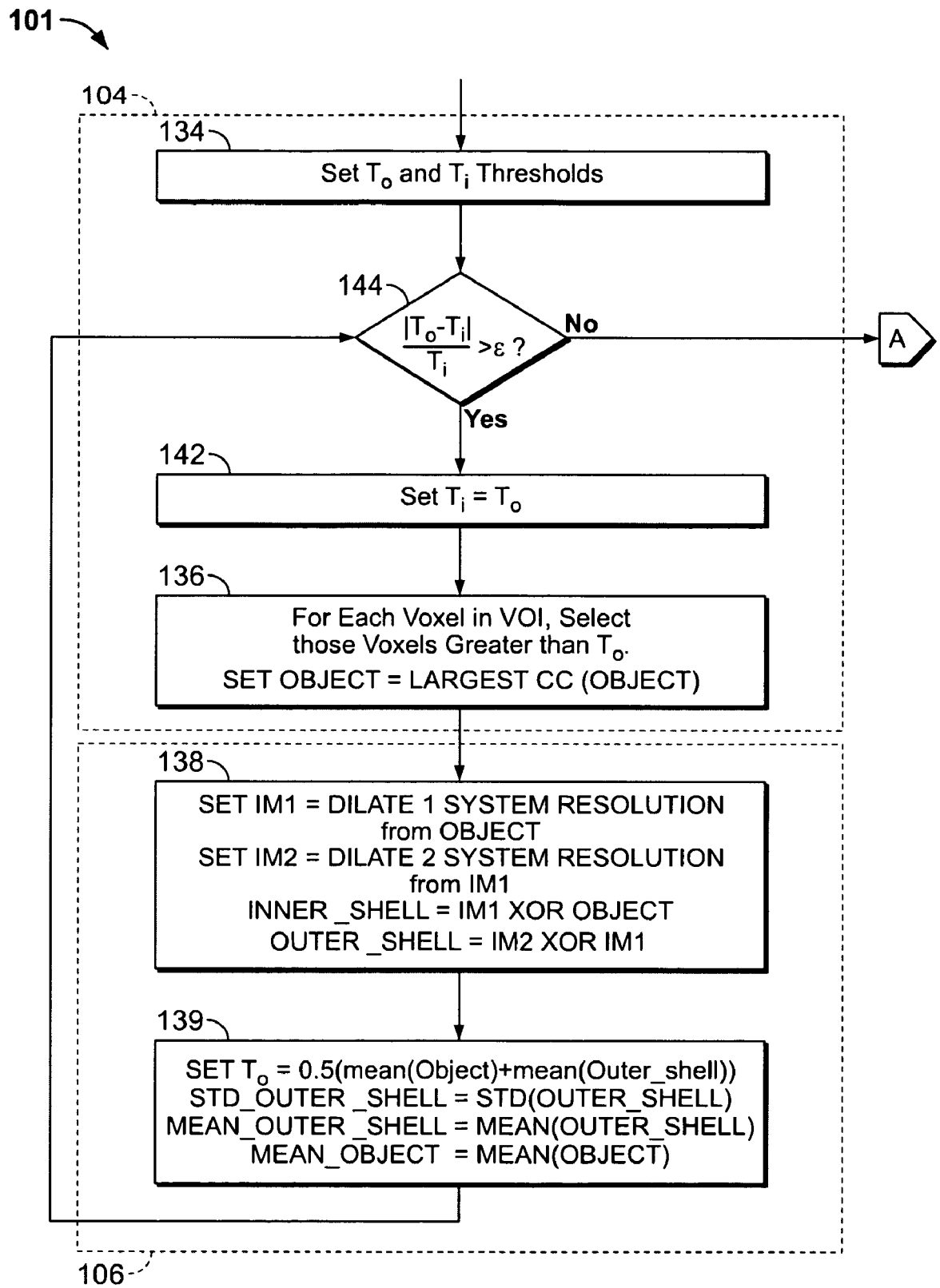
FIG. 5 is a flow chart further detailing the determination of an interior region, a transition region, and a background region using the object boundary and a transfer function of the imaging apparatus.
Figure 5B:
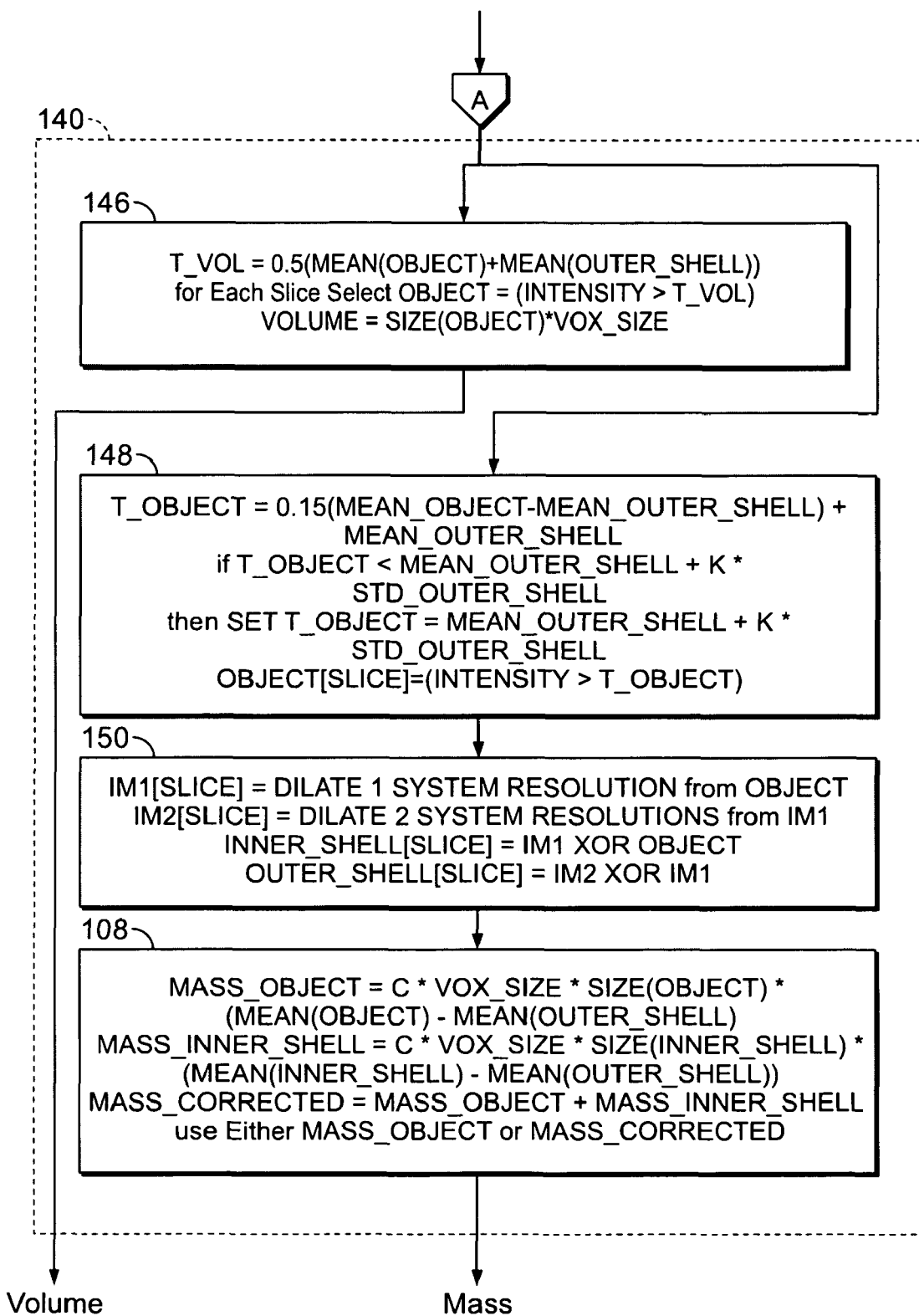

A suitable EM based segmentation algorithm is described by flowchart 101 in FIG. 5 for all Class 1 objects at a particular threshold value. This EM based segmentation algorithm uses a value for CT system resolution. The EM algorithm essentially assumes that the mean of the initial thresholded object is correct. The EM algorithm then looks at the region outside the system resolution region and computes the mean of that "background." Based on the two mean values, the EM algorithm estimates a new 50% threshold value and compares it with the original threshold value. If there is a difference greater than a predetermined error tolerance, the EM algorithm uses the new threshold value as the initial threshold value and repeats the procedure. Once the algorithm identifies the different classes of tagged items in the colon, a decision is made to remove most of the class 1 objects and possible class 2b objects. Class 2a and class 3 objects are visually identified and left in the exam, as removing these objects would create artifacts. Some configurations of the present invention incorporate the effect of the imaging system transforms in deciding which tagged regions in the colon to remove.

More particularly, a mean value of an immediate neighborhood of an object in the subvolume is determined to estimate the background, excluding un-measureable regions at 104. The interior, transition, and background regions are then determined, at 106, using the boundary of the object and the system transfer functions. Next, a hybrid algorithm is used to estimate the mass and/or volume of the object at 140.

In more detail, for the determination of a mean value at 104, an upper intensity threshold $T_o$ and a lower intensity threshold $T_i$ are set at 134. While excluding voxels within the region or regions of exclusion, voxels of the object (i.e., the interior of the object) in the image are determined at 136 in accordance with at least one of the upper intensity threshold or the lower intensity threshold. (An object may be darker or lighter than its surroundings, and/or the image may be a negative image.) For example, for each voxel in a volume of interest (which may include only one slice, and thus be more analogous to a region having a predetermined thickness, or which may include a plurality of slices), those voxels greater than, say, $T_o$ are determined. An object is then defined as the largest volume CC of the object defined by the voxels so determined. Next, an inner shell and an outer shell of the object is determined at 138 in accordance with the determined or defined object and the system resolution. For example, an array of voxels IM1 is determined from the object by expanding ("dilating") the object by a number of voxels equal to the system resolution. For example, if the system resolution is one voxel, IM1 represents a collection of voxels including the object voxels plus all of the voxels one voxel distant from the object voxels. If the system resolution were two voxels, IM1 would be dilated 2 voxels in this configuration. Also, IM2 represents an array dilated twice the system resolution from IM1. (The dilation factor of two system resolutions for IM2 is suitable for many applications in which lesions or calcifications are to be quantified, but other dilation factors for either or both IM1 and IM2 can be determined empirically in other configurations or for other purposes.) The inner shell of the object is determined by excluding (XORing) the set (not the values) of voxels in the object with the set of voxels in IM1. In other words, those voxels only in IM1 and not in the object become the voxels in the inner shell. The outer shell of the object is determined by excluding the set of voxels in IM1 with those in IM2.

Some configurations of the present invention then reset one or more of the thresholds in preparation for another iteration to further refine the object, the inner shell, and the outer shell. More particularly, in the represented configuration, one of the threshold values is reset using a value written as:

$$T_o=0.5(\text{mean}(\text{Object})+\text{mean}(\text{Outer\_shell})),$$

where the means are taken of the intensities of the voxels in the object and in the outer shell of the object. Means and standard deviations (STD) are also determined in some configurations for later use:

STD_OUTER_SHELL=STD(OUTER_SHELL)

MEAN_OUTER_SHELL=MEAN(OUTER_SHELL)

MEAN_OBJECT=MEAN(OBJECT)

where the respective functions are functions of the intensities of the voxels within the outer shell and/or the object.

Also, some configurations provide a measure of at least one of mass (at 148, 150, and 108) or volume (at 146) of the object in the image utilizing the intensities of the determined inner shell or of the determined outer shell to determine the provided estimate.

In some configurations, the upper and/or lower thresholds are adjusted at 139 and 142, and 136 and 138 are repeated until an accuracy test at 144 is satisfied.

In various configurations in which a volume estimate is provided, providing the volume estimate comprises utilizing, at 146, voxels of the object and determining the volume of the object in accordance with the number of voxels in the determined volume of the object and a size of each voxel. More particularly, in some configurations, a variable T_VOL is determined by a relationship written as:

$$T\_VOL = 0.5(MEAN(OBJECT) + MEAN(OUTER\_SHELL)),$$

where the mean functions are taken over the intensities of the voxels in the object and the outer shell. Then, for each slice (in a multislice or 3-D system), the object is selected from those voxels having an intensity greater than T_VOL. (In cases in which the object appears darker than the surroundings, or in case a negative image is used in which the object appears darker than the surroundings, those voxels having a lesser intensity are selected.) The estimate of the volume is equal to the size of the object (in number of voxels meeting the intensity criteria) times the size (volume) of a voxel.

In various configurations in which a mass estimate is provided, providing the mass estimate comprises determining at 148 an adjusted interior region of the object. Also, an adjusted inner shell of the object is determined at 150 in accordance with the size of the object. A mass of the object is determined at 108 in accordance with the size of each voxel, the size of the adjusted interior region of the object, and a difference between representative intensities of the adjusted interior region of the object and of the adjusted outer shell of the object.

More specifically, in some configurations, a variable T_OBJECT is defined as a function of mean intensities of the object and its outer shell. For example, using the 15% (0.15) point on the slope of the transition to the object interior will capture most of the densities of the object without including excessive noise, (which can be adjusted in other configurations), $$T\_OBJECT = 0.15*(MEAN\_OBJECT - MEAN\_OUTER\_SHELL) + MEAN\_OUTER\_SHELL$$

Next, the following test is performed, using a parameter K which can be determined empirically, and if the test succeeds, T_OBJECT is set to another value as a function of the intensities of the mean outer shell and the standard deviation of the outer shell:

IF $T\_OBJECT < MEAN\_OUTER\_SHELL + K*STD\_OUTER\_SHELL$

THEN SET $T\_OBJECT = MEAN\_OUTER\_SHELL + K*STD\_OUTER\_SHELL$

Once T_OBJECT is determined, the object is defined (in each slice, in a multi-slice 3D image) as those voxels for which the intensity is greater than (or, in some configurations, less than) the value T_OBJECT.

In some configurations, providing a mass estimate also comprises determining, at 150, an adjusted inner shell of the object and an adjusted outer shell of the object, and determining, at 108, a mass of the object in accordance with the size of each voxel, the size of an adjusted interior region of the object, and a difference between representative intensities of the adjusted interior region of the object and intensities of the adjusted outer shell of the object.

More particularly in some configurations, the adjusted OBJECT[SLICE] at 148 is used to adjust the inner shell and outer shell using the relationships at 138 or similar relationships. Then, the mass of the object is determined using a relationship written:

$$MASS\_OBJECT = C*VOX\_SIZE*SIZE\_OBJECT* (MEAN(OBJECT) - MEAN(OUTER\_SHELL))$$

where C is a constant chosen in accordance with the material of the object (e.g., a known density of the material comprising a calcification), VOX_SIZE is the volume of a voxel, SIZE_OBJECT is the size of the object (i.e., its interior region, for example, the calcification region), and the means are functions of the intensities of the voxels within the object and of the outer shell of the object.

The mass of the inner shell is determined in some configurations in accordance with a relationship written:

$$MASS\_INNER\_SHELL = C*VOX\_SIZE*SIZE(INNER\_SHELL)*(MEAN(INNER\_SHELL) - MEAN(OUTER\_SHELL)),$$

where SIZE(INNER_SHELL) is the number of voxels comprising the inner shell, and the means are intensity means of the voxels in the inner shell and the outer shell. The determined mass of the inner shell allows a corrected mass to be determined and output in some configurations of the present invention:

$$MASS\_CORRECTED = MASS\_OBJECT + MASS\_INNER\_SHELL$$

It will be understood that the "less than" test can be reversed depending upon the type of image (positive or negative) and type of object (light or dark).

Once the correct threshold values are determined the hybrid quantification algorithm calculates the mass and the volume of the objects of interest at 140.

Figure 6:
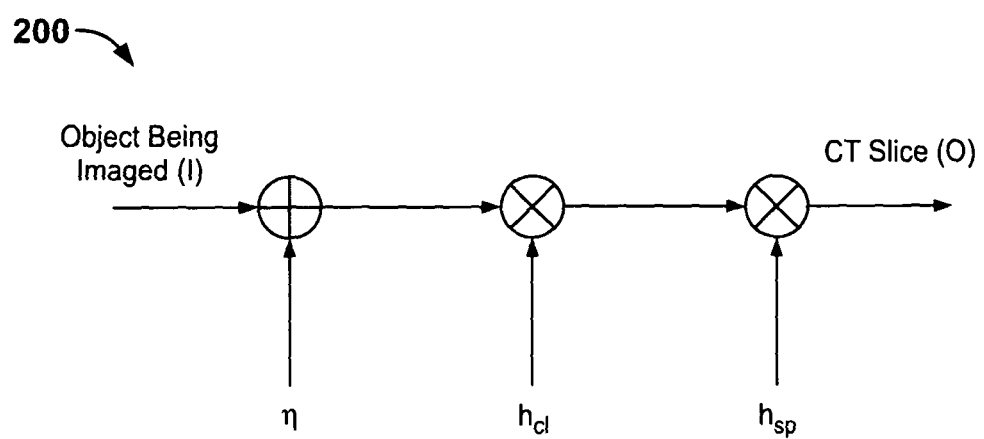
FIG. 6 is a representation of a system transfer function of the CT imaging system of FIGS. 1 and 2.

Density D, volume V, and mass m of an object are related by the relationship m=DV. CT imaging produces a value in Hounsfeld units for a voxel representative of an average density of a unit volume defined by the size of the unit voxel, δxδyδz. The density of the voxel is determined by filtered backprojections of multiple rays that indicate an amount of absorbed photons in the unit volume. (For simplicity, the effect of multiple wavelengths and other approximations in reconstruction algorithms are not considered, but reconstruction filters, field of view i.e., FOV, and slice thickness are considered.) Thus, the voxel value is an average density of the volume of the voxel, and the average density is in turn related to the amount and composition of matter in that volume. If the unit voxel volume δxδyδz is occupied by a metal, then the matter in this volume may be dense and absorb most of the radiation passing through it, resulting in a high number of Hounsfield Units (HUs). If the unit volume contains a mixture of two components, for example, calcium and water, the volume will absorb photons in proportion to the amounts of the components in the mixture. The HU of a voxel is thus an estimate of the average density of matter in the voxel volume, provided that there is no signal corruption or noise. However, CT imaging systems are not perfect and do introduce some noise, as shown in model 200 of FIG. 6, where η represents additive photonic noise, $h_{ct}$ represents a CT reconstruction transfer function, $h_{sp}$ represents an effective transfer function for partial volume, and ⊗ represents convolution.

Figure 7:
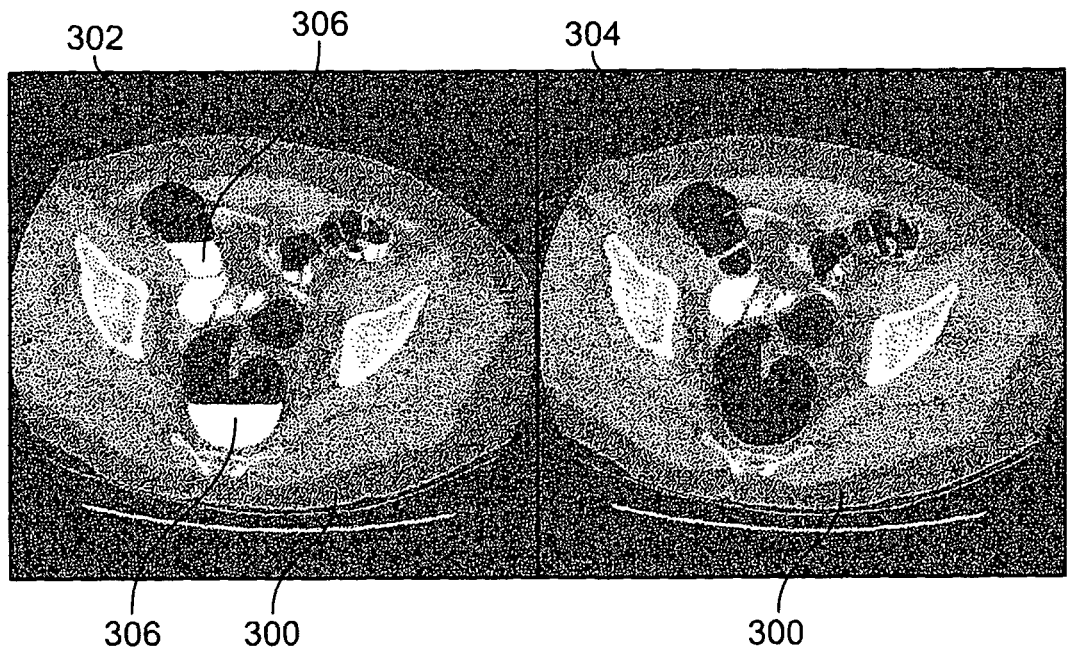
FIG. 7 is an axial view of a subtraction wherein a tagging field is visible on the left hand side and is absent on the right hand side.
Figure 8:
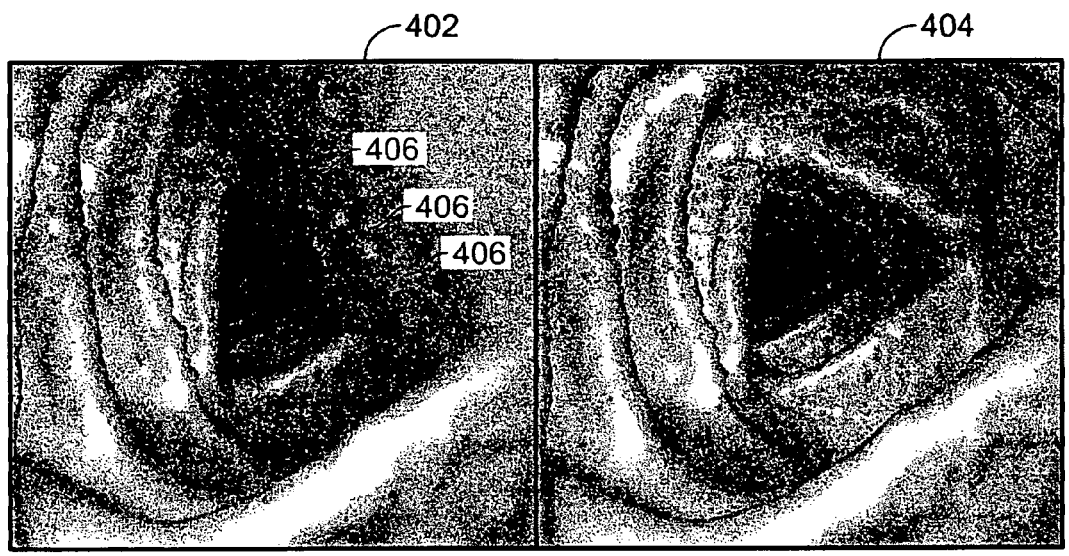
FIG. 8 is a navigator (3D) view of a tagging fluid on the left hand side and of its removal on the right hand side.
Figure 9:
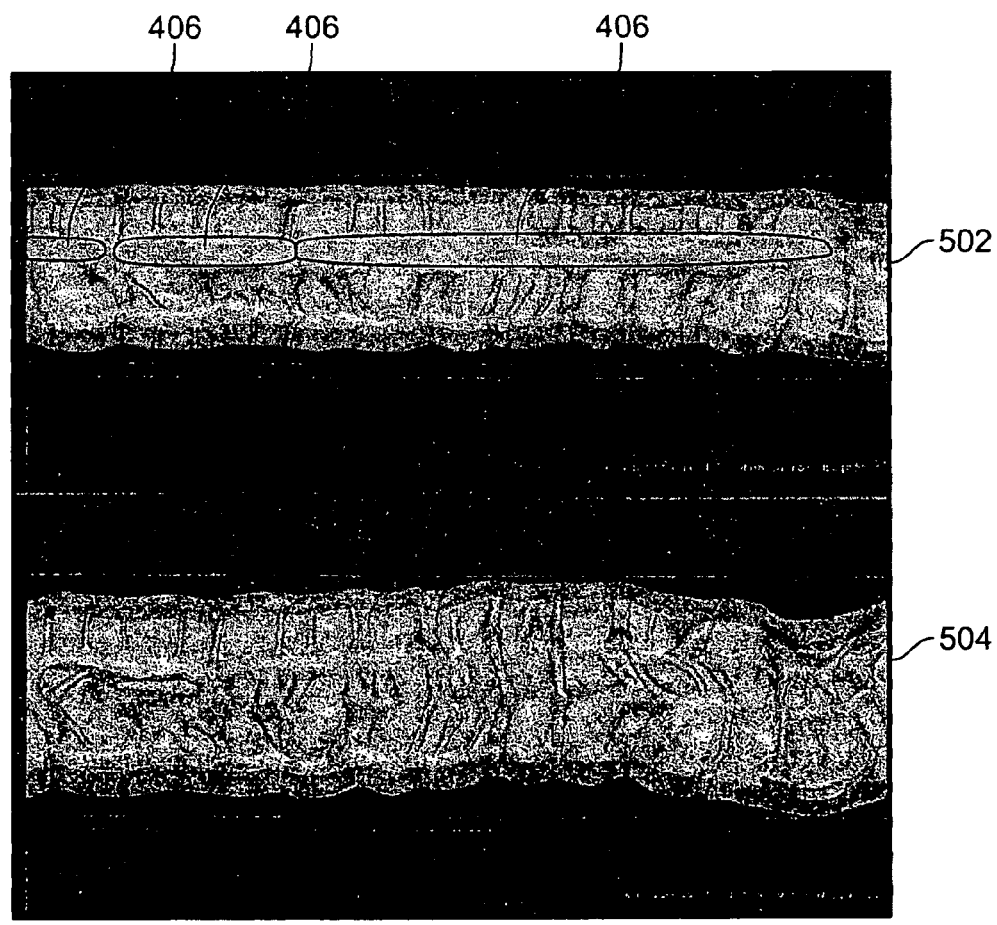
FIG. 9 is a virtual dissected view of the tagged fluid of FIG. 8 shown before its remove at the top of FIG. 9, and after its removal on the bottom of FIG. 9.

The effectiveness of some configurations of the present invention is shown in FIGS. 7-9. FIG. 7 represents two axial views 302 and 304 of the same colon section 300 wherein a tagging field 306 is visible on the left hand side 302 and is absent on the right hand side 304, having been removed from the image by a configuration of the present invention. FIG. 8 represents two navigator (3D) views 402 and 404 of the same tagging region of a colon, showing tagging fluid 406 on the left hand view 402 and of its removal from the image on the right hand view 404. FIG. 9 is a pair of virtual dissected views 502 and 504 of the tagged fluid 406 of FIG. 8 shown before its removal at view 502 and after its removal from the tagged image at view 504. Note that the underlying structures in FIGS. 8 and 9 are clearly visible after the tagged fluid 406 is removed.

While the invention has been described in terms of various specific embodiments, those skilled in the art will recognize that the invention can be practiced with modification within the spirit and scope of the claims.

What is claimed is:

1. A method for suppressing tagged material in prepless colonoscopy, said method comprising:
   identifying and segmenting multiple density classes, intensity classes, or both in a volumetric medical image of a patient including a volume of the patient's colon;
   classifying the volume of the patient's colon into a plurality of type classifications based upon the identified and segmented density classes, intensity classes, or both, using an adaptive threshold-based methodology that utilizes system resolution derived thresholds;
   subtracting, suppressing, or leaving the tagged material in the image in accordance with the type classifications to produce a resulting image; and
   visualizing the resulting image.

2. The method of claim 1, wherein said classifying the volume of the patient's colon into a plurality of type classifications further comprises determining size and maximum thickness of each identified and segmented class.

3. The method of claim 1 further comprising acquiring the volumetric medical image of the patient.

4. The method of claim 1 further comprising acquiring a volumetric computed tomographic (CT) image of the patient.

5. The method of claim 1 wherein said identifying and segmenting comprises adaptively localizing spatial regions of an object or objects of the highest density, intensity, or both using a system resolution dependent expectation maximization (EM) algorithm.

6. The method of claim 5 further comprising removing the spatial regions of the object or objects of highest density, intensity, or both from the imaged volume of the colon.

7. The method of claim 6 further comprising setting a threshold at a new level to localize additional spatial regions of an object or objects of the next highest density, intensity or both.

8. The method of claim 7 wherein said further comprising acquiring a volumetric computed tomographic (CT) image of the patient.

9. The method of claim 1 wherein said adaptively classifying the volume of the patient's colon into a plurality of type classifications further comprises using a hierarchical methodology based on density, intensity, or both to classify the identified and segmented classes into the plurality of type classifications.

10. The method of claim 1 wherein said adaptively classifying is repeated with an initial threshold from a previously subtracted or suppressed tagged material used to further identify and segment classes into the plurality of type classifications.

11. A non-transitory machine-readable medium or media having instructions recorded thereon configured to instruct a computer to visualize an image with suppression of tagging material for prepless colonography, said instructions including instructions configured to instruct the computer to:
   identify and segment multiple density classes, intensity classes, or both in a volumetric medical image of a patient including a volume of the patient's colon;
   classify the volume of the patient's colon into a plurality of type classifications based upon the identified and segmented density classes, intensity classes, or both, using an adaptive threshold-based methodology that utilizes system resolution derived thresholds;
   subtract, suppress, or leave tagged material in the image in accordance with the type classifications to produce a resulting image; and
   visualize the resulting image.

12. The medium or media of claim 11 further having instructions recorded thereon configured to instruct the computer to determine size and maximum thickness of each identified and segmented class.

13. The medium or media of claim 11 further having instructions recorded thereon configured to instruct the computer to acquire the volumetric medical image of the patient.

14. The medium or media of claim 11 wherein said instructions configured to identify and segment comprise instructions configured to instruct a computer to adaptively localize spatial regions of an object or objects of the highest density, intensity, or both using a system resolution dependent expectation maximization (EM) algorithm.

15. The medium or media of claim 14 further having instructions recorded thereon configured to instruct the computer to remove the spatial regions of the object or objects of highest density, intensity, or both from the imaged volume of the colon.

16. The medium or media of claim 15 further comprising instructions configured to instruct a computer to set a threshold at a new level to localize additional spatial regions of an object or objects of the next highest density, intensity or both.

17. The medium or media of claim 16 wherein said instructions configured to acquire the volumetric image of the patient comprise instructions configured to instruct the computer to acquire a volumetric computed tomographic (CT) image of the patient.

18. A medical imaging apparatus having a radiation source, a detector array, an image processor, a display, and a memory, said medical imaging apparatus controlled by a computer configured to operate the medical imaging apparatus to produce medical images using the radiation source, the detector array, the image processor, the display, and the memory, and said memory having stored therein instructions configured to instruct the computer to:
   identify and segment multiple density classes, intensity classes, or both in a volumetric medical image of a patient including a volume of the patient's colon;
   classify the volume of the patient's colon into a plurality of type classifications based upon the identified and segmented density classes, intensity classes, or both, using an adaptive threshold-based methodology that utilizes system resolution derived thresholds;
   subtract, suppress, or leave tagged material in the image in accordance with the type classifications to produce a resulting image; and
   visualize the resulting image.

19. The apparatus of claim 18 wherein said instructions configured to classify the volume of the patient's colon into a plurality of type classifications further comprises instructions to determine size and maximum thickness of each identified and segmented class.

20. The apparatus of claim 19 wherein said instructions configured to identify and segment comprise instructions configured to instruct the computer to adaptively localize spatial regions of an object or objects of the highest density, intensity, or both using a system resolution dependent expectation maximization (EM) algorithm.

21. The apparatus of claim 20 further having instructions stored in memory configured to instruct the computer to remove the spatial regions of the object or objects of highest density, intensity, or both from the imaged volume of the colon.

22. The apparatus of claim 21 further comprising instructions stored in memory configured to instruct the computer to set a threshold at a new level to localize additional spatial regions of an object or objects of the next highest density, intensity or both.

* * * * *